Patented Feb. 2, 1954

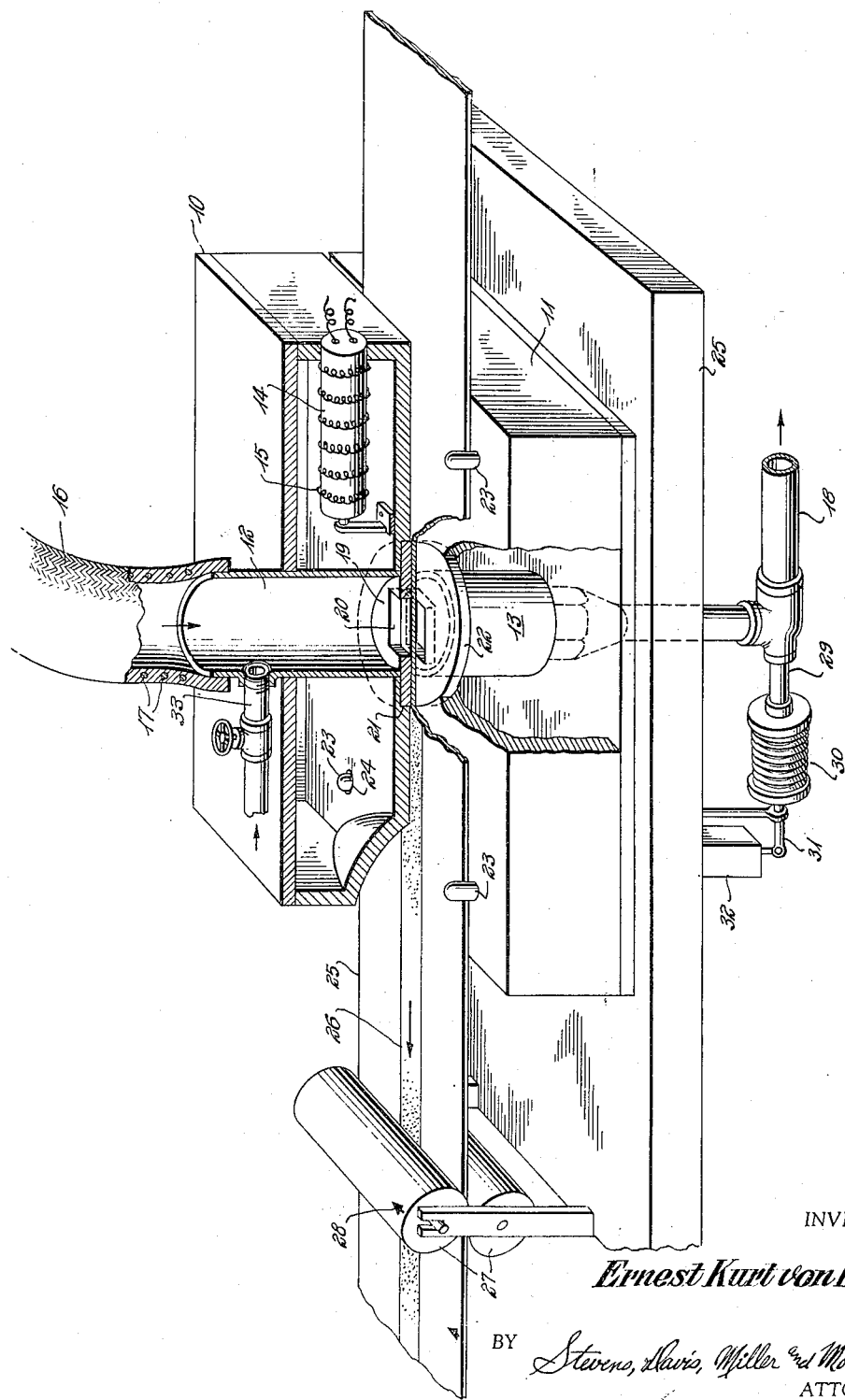

2,667,779

UNITED STATES PATENT OFFICE 2,667,779

ANALYTICAL APPARATUS FOR SMOKES AND GASES

Ernest Kurt von Brand, Dobbs Ferry, N. Y.

Application December 29, 1950, Serial No. 203,309

2 Claims. (Cl. 73—28)

This invention relates to an apparatus for conducting studies of the content of fluid such as liquid and air pollution, gas contamination studies and the like. It is especially concerned with providing a device for affording an accurate indication of the quantity of soot and unburned fuel present in the gases being discharged from a combustion chamber. For convenience, the device is hereinafter sometimes referred to as a smoke recorder.

There are several testing devices in use in industry today from which some indication of the degree of contamination of waste gases can be ascertained. These devices fall into two distinct types which are briefly discussed hereinafter.

A first type can be referred to as a continuous smoke tester which operates on the principle of determining the degree of transparency of the gas by the use of photo-electric devices. A recording device is used in conjunction with photoelectric equipment so that a permanently visible record of the study is provided. Aside from the fact that electrical devices such as the photoelectric equipment is expensive, they are of limited utility. The main disadvantage inherent in this type of equipment is the poor sensitivity to smoke below the visibility level. This disadvantage prevents the use of the device except in the study of gases containing an established minimum of contamination. Other factors limit their utility such as unsuitability for being transported for various applications and exacting installation requirements which render its adaptation to specific situations expensive and time consuming. Furthermore, devices of this character are delicate and require considerable attention if they are to be maintained in proper working order.

Another type of testing device is commonly known as the spot tester. Spot testers provide a paper record from the smoke itself by causing smoke to deposit a portion of its contaminant upon a suitable paper. The means employed for doing this are of varying types. Some devices utilize an intermittently operated filter tape, the operation being either manual or mechanical. For various reasons, equipment of the spot testing type is unsatisfactory. In the first place, no understanding or indication can be derived from a single spot test as to whether or not the smoke condition that is made apparent by the spot has been continuous and constant during the taking of the record or has continuously varied from one degree of density to another. Therefore, in order to determine what conditions are taking place in a combustion chamber over a given interval of time, it is necessary to make several spot tests to indicate the changing conditions. This, of course, requires a considerable amount of time. Furthermore, it is not possible to make immediate adjustments to the burner and to observe their effects during the taking of the record. The record must first be taken and studied before any adjustments can be made, and after the adjustments are made, additional spot tests must be run in order to determine the effect of the adjustment to the burner. Oftentimes several series of tests and adjustments are necessary in order to effect the necessary corrections to the burner condition. The adjustment is difficult to make because the burner conditions are continuously changing, especially if the burner has just been started in operation because at such time the combustion chamber is cold, as is the incoming fuel, and thus combustion efficiency is lower than when the burner and fuel have become heated. Therefore, in order to obtain reliable data and to make accurate adjustments, it is necessary to allow the burner to heat up for many minutes before spot tests are completed.

Additionally, in using the spot test, if the smoke that is being examined is heavily laden with contaminants, the initial spot that is deposited is likely to be so dense as to be meaningless except to indicate that the gas is quite heavily laden with contaminants. Oftentimes, a spot test of half the time of a previously made one under substantially the same conditions will produce a smoke spot of substantially the same color and density. Therefore, it is necessary to run several spot tests of progressively shorter duration before a spot can be produced which will have a definite meaning when compared with its standard. The main disadvantage of the spot type test is that it does not afford a record corresponding to the changes that take place in a combustion chamber of a burner either as the changes are effected by reasons of the physical conditions of the burner or as effected by adjustments made thereto by the individual who is examining it, as a result of which disadvantages, accurate records and adjustments are extremely difficult to obtain, if not in many cases, impossible. There is also a good deal of condensation trouble. If spot testers are not warmed up (on furnace, or in another makeshift manner) frequently first spots are wet and soggy and must be repeated. Spot testers have been brought to a fair degree of perfection within the limits of their applicability and for those purposes usually produce satisfactory results. However, there is considerable need for an instrument of a more sensitive nature so as to permit a higher degree of perfection in the building and operation of combustion chambers.

It is therefore the purpose of this invention to overcome the foregoing described disadvantages.

It is an object of this invention to provide a device with which the content of a fluid as regards a particular constituent can be speedily and accurately determined, in a continuous manner so as to provide an unbroken record of the test from its inception to its conclusion; and further, to provide a device adaptable to various conditions of the fluid under study, including high-moisture content, high- and low-constituent content; and further, to provide a device in which the rate of fluid flow can be controlled and the rate of exposure and the area of the sensing medium exposed may be varied as required by conditions of the fluid. It is a further object of this invention to construct such a device which shall be simple to operate and economical to produce.

Generally speaking, the device of this invention operates to continuously draw off and filter a contaminated gas through a continuously moving filter-tape so as to make it possible to observe the contaminant content immediately upon beginning to study the gas, and to observe changes in the degree of contamination, either as effected by physical changes in the burner itself or in adjustments made to the equipment under test which the tape information indicates as desirable. For rendering the device eminently practical of application in a great multiude of differing circumstances, the device is adapted to vary the quantity, velocity and temperature conditions of the incoming gas. It is also adapted to filter a given quantity of gas through either a lesser or greater portion of the tape by altering the area of the tape that is exposed to the gas, or by changing the speed at which the tape is moved through the gas stream. Any of the alterations in the operational characteristics of the device can be made without any delay and the effect of such alteration made immediately apparent in the tape record.

The device involves a minimum of parts, is very slight in weight and readily portable for use wherever desired, and is extremely simple of operation.

The specific embodiment of the invention described herein employs a pair of interfitting plates, one an inflow and one an outflow plate, each plate having a conduit through its vertical dimension in position to communicate one with the other. The conduit in the inflow plate is connected by suitable flexible means to a source of gas to be studied and the outflow plate is connected to a vacuum device. A reel of filter tape is mounted in conjunction with the plates, and filter tape is drawn by suitable means horizontally between the inflow and outflow plates. In passing between the plates, the tape travels in a path which laterally intersects the conduit opening, thus causing such gas as is drawn through the conduit by the vacuum to be filtered by the tape. In thus passing between the hot (200° F. or more) smooth surfaces of the fixture, the filter tape is conditioned with respect to permeability, uniformity in surface and humidity, so important in securing reproducible results. Suitable means is provided above and below the tape at the mouth of each conduit whereby the dimensions of the area of the tape that is exposed may be altered as necessary. The tape is considerably wider than the mouths of the conduits so that the tape itself acts as a gasket and seals the vacuum side of the unit. The inflow plate fits sufficiently tightly on the outflow plate as to substantially eliminate leakage into the gas stream from the atmosphere.

Referring now to the drawings illustrating the invention, numeral 10 denotes the inflow plate or chamber and numeral 11 the outflow plate. Numeral 12 denotes the inflow conduit and numeral 13 the outflow conduit communicating with the conduit 12. Numeral 14 denotes a small electric heater which is mounted in a chamber in the inflow plate, which chamber is denoted by numeral 15. Numeral 16 denotes a flexible intake conduit which, in the described embodiment of this invention, is provided with an electrical heating element as indicated by numeral 17. Conduit 13 is connected to a source of vacuum by suitable piping or tubing as indicated by numeral 18. The vacuum source is not illustrated.

An inflow insert, numeral 19, is positioned in the path of the incoming gas stream. Insert 19 is provided with a rectangular slot denoted by numeral 20. Insert 19 seats in a recess denoted by numeral 21 provided in the lower face of the inflow plate. The depth of the recess is equal to the thickness of the insert so that when the insert is in position in the recess, a smooth and flat lower surface, including the lower portion of the plate and the insert, is provided for contacting the before-mentioned filter tape. Similarly received in the outflow plate is a lower insert denoted by numeral 22, identical in all respects with upper insert 19.

A plurality of pins denoted by numeral 23 are embedded in the upper surface of the outflow plate. The pins are positioned to form a guide path for the filter tape and to serve as positioning means for the inflow plate. The inflow plate is provided with complementary recesses or holes as at numeral 24, for receiving the pins 23.

The filter tape is denoted by numeral 25 and in the drawing is shown in position between the plates with a portion thereof cut away revealing the lower insert. Numeral 26 denotes concentrated contaminant accumulation on the tape, or discoloration of tape if treated (activated by chemical reagent) tape is used for detecting colorless contaminants in gas stream under test, e. g., sulphur, starch dust, etc.

A pair of draw-off rollers denoted by numeral 27 one of which is driven by a synchronous motor, not here illustrated, is provided for advancing the filter tape. One of the rollers, preferably the driving roller, is provided with a suitable paper perforator or marker as at numeral 28 so that the tape is marked at intervals, from which markings and the speed of the driving roller the time involved in producing the record may be readily determined.

Fresh filter tape is drawn from a storage reel and collected upon a collection reel, neither of which reels is illustrated in the drawings. The collection reel is driven to take up the tape as it is advanced by the draw-off rollers. For short tests, a collection reel is not absolutely necessary.

All of the foregoing elements, including the storage and collection reels, the motor for driving the draw-off rollers, the vacuum pump, are suitably mounted on a common base and the entire assembly may be provided with a top (not shown in the drawings) for rendering the equipment easily portable.

Considerable difficulty has been encountered in the use of smoke test equipment as a result of condensation taking place in the line leading to the testing equipment, within the tester itself, and on the filter paper. After condensation has taken place for a considerable period of time, it is found that the interior of the conduits leading to the testing chamber are quite heavily covered with soot and other contaminants. This leads to a very undesirable condition because in the first place the condensate carries with it a considerable amount of the contaminant contained in the gas and thus a portion of it never reaches the filter medium. At other times, when the temperature conditions are not such as to permit condensation, that is to say, when the gases that are taken into the intake line stay at about the same temperature until they reach the testing chamber, considerable previously deposited sooty material is picked up by the intake gas and deposited on the filter medium and included as a part of the study of the gas then being taken in. Obviously, either of these conditions leads to an inaccurate result, the magnitude of which is not easily determinable. Additionally, where the temperature in the tester is considerably below the temperatures of the incoming gases and the gases are heavily laden with moisture, such moisture may be deposited upon the filter tape and cause it to malfunction or even separate.

I have found that all the foregoing difficulties can be eliminated by providing a heated inflow conduit and by heating the conduit in the inflow plate. This is the purpose of the small heater 14 heretofore mentioned which is adapted to give sufficient heat to maintain the incoming gases above the dewpoint. If the inflow conduit is sufficiently short, in some instances it has been found unnecessary to heat it as it receives enough heat from the heated plate to which it is attached.

In order to adapt the device to measure contamination from an extremely high to an extremely low concentration, a number of inserts are provided having pre-standardized openings of progressively increasing area. Obviously, many arrangements are possible for varying the area of tape exposure opening and the invention, of course, is not limited to the use of inserts. For example a continuously variable aperture similar to a camera shutter may be provided.

The plates may be formed of any kind of material that is desired. If the inflow plate is formed of a transparent material such as glass or plastic, the record that is deposited on the filter tape will be available for observation much earlier than would be the case where the plate is opaque, the actual time of course depending on the tape speed. If it is desired to make the plate of metal, some time may be saved in observing the record if a portion of the lower surface and end of the inflow plate is cut away to reveal the filter tape at a point nearer the conduit as at numeral 28.

It is oftentimes desirable to study combustion conditions in a given burner unit over a period of several days for the purpose of gaining information relative to its operation under varying atmospheric conditions. The device of the invention herein is easily adaptable to operate automatically and continually in conjunction with the burner for any given period of time. For example, a suitable electrical relay system may be associated with the device for connection with the thermostat of the burner, which relay operates a microswitch. Preferably, the relay is arranged to set the testing equipment in motion just prior to the time when the burner cuts on so that a record of the performance of the burner under cold conditions will be included in the study. Also, preferably, the tester should be allowed to operate a short time after the burner has cut off and this may be accomplished by several means, for example, by a thermostatically-operated microswitch, the thermostat being responsive to the temperature conditions within the flue or burner chamber. It has been discovered that a good deal of the contamination produced in the gases of the burner as given off through the flue results from the continuance of oil flow to the burner from the lead-in pipe after the flame dies for want of air, resulting in much oil smoking and carbonizing on the burner and furnace surfaces. Thus, knowing the condition, it admits of study and remedy.

In conducting tests with the device of this invention, the plates are assembled with tape supplied therebetween in a position to be drawn off by the driving roller. The inflow side is connected to the source of fluid to be analyzed and heat is supplied to the heaters if necessary. Vacuum source of a pre-established pressure is supplied to the outflow conduit and the tape is set in motion at whatever speed considered feasible as indicated or dictated by pre-standardized test tapes or mediums. If the contaminant content is known to be low, a small tape exposure aperture is provided by using small inserts so as to increase the density of the deposit thus making the record more apparent. It will be understood that the speed of tape movement must be known. This obviously can be determined in advance by providing means to drive the driven roller at a particular speed which speed has been previously correlated with the standards of compression. Obviously also, the time of the test may be determined by stopwatch and the length of tape exposed measured, from which factors the speed of tape can readily be determined.

If the object of the test is to regulate a piece of equipment to its optimum operation, adjustments are made to the equipment as dictated by the observable condition of the sensing medium as it comes into view from between the plates at the time of the test.

The record, once having been made, is compared with pre-standardized test tapes from which comparison the quantity of soot or other contaminants contained in the gas can be determined by any known comparison methods.

Equally important from the standpoint of utility of the device of the invention is its use in regulating conditions in any type of equipment that utilizes a combustion chamber. For example, it is easily possible to learn the optimum combustion mixture of air, moisture and fuel required by combustion engines of all types.

If desired the device may be arranged to sound an alarm upon the attainment of a predetermined degree of contamination in a fluid. As shown in the drawings, a bellows 30 is connected to vacuum conduit 19 through tube 29 and to switch 32 through linkage 31. Increase in contamination upon the tape will result in a pressure change on the vacuum side which is utilized to actuate switch 32 and sound an alarm.

While the device of this invention has been described particularly as applied to smoke study, it is suitable for use in studying various problems and conditions requiring quantitative analysis. For example, the tape may be chemically treated to give a color change when exposed to a particular fluid, i. e., an iodine treated tape to measure starch concentration by the well known blue color test. Alternatively, iodine vapor or mist may be fed through tube 33 into the inflow conduit to mix with starch laden fluid and thus react upon contact with an untreated tape. Sulphur etc. contamination or content may be similarly determined. It is also possible to study liquids either as to contaminant content in particle or colloidal state, or solution characteristics, the former being studied by the filter technique and the latter by the chemical technique. In studying liquids, it is of course necessary to use a tape that will not break or tear, or be destroyed chemically, such as a specially chosen film; it is also necessary to utilize a more porous tape, e. g., a tape containing minute perforations. In liquid study, the film emulsion may be sensitized to indicate changes in the composition of the liquid sampled continuously.

The device may be adapted to measure radioactive contamination of any fluid by utilizing a photosensitive film, into contact with or through which the fluid is fed.

The term "sensing medium" as used in the appended claims is intended to include a filter tape, a chemically treated tape, a sensitized film or any element adapted to afford a determinable change after exposure to a fluid under study.

Various modifications to the device as described herein may be made without departing from the spirit of the invention. It is therefore to be understood that the invention is in no way intended to be limited by or to the specific embodiments herein described and illustrated.

I claim:

1. A device for measuring the quantum of solid suspended in a gas that comprises a pair of plates arranged face to face to define therebetween a passageway for a filter tape, the facing surfaces of said plates being uniformly hard and smooth throughout their entire area, means to move succeeding portions of a filter tape through the passageway defined between said plates, said plates having registering apertures on opposite sides of the tape passageway, two defining edges of each of said apertures being parallel to the direction of tape movement and the other two defining edges of each of said apertures being equal distances apart in any plane parallel to the direction of tape movement, the area of said plates being much greater than the area of the apertures therein, one of said plates being biased toward the other to compress the tape passed therebetween so that it may function as a gasket, means to deliver a gas to be tested to one of said apertures and means to create a lower pressure than that of the gas delivery pressure at the other of said apertures.

2. A device for measuring the quantum of solid suspended in a gas that comprises a pair of plates arranged face to face to define therebetween a passageway for a filter tape, the facing surfaces of said plates being uniformly hard and smooth throughout their entire area, means to move succeeding portions of a filter tape through the passageway defined between said plates, said plates having registering apertures on opposite sides of the tape passageway, two defining edges of each of said apertures being parallel to the direction of tape movement and the other two defining edges of each of said apertures being equal distances apart in any plane parallel to the direction of tape movement, the area of said plates being much greater than the area of the apertures therein, one of said plates being biased toward the other to compress the tape passed therebetween so that it may function as a gasket, means to heat said tape immediately in advance of its passage across the registering apertures, means to deliver a gas to be tested to the aperture of the heated plate and means to create a lower pressure than that of the gas delivery pressure at the other of said apertures.

ERNEST KURT von BRAND.

References Cited in the file of this patent

UNITED STATES PATENTS

| Number | Name | Date |
|--------|------|------|
| 984,047 | Touzalin | Feb. 14, 1911 |
| 1,207,518 | Eddy | Dec. 5, 1916 |
| 2,076,553 | Drinker et al. | Apr. 13, 1937 |
| 2,228,216 | Morgan | Jan. 7, 1941 |
| 2,312,295 | Dahlman et al. | Feb. 23, 1943 |
| 2,320,368 | Leathers | June 1, 1943 |